May 12, 1953    B. COWAN ET AL    2,638,226
SCREENING AND FILTERING APPARATUS
Filed Nov. 8, 1948    3 Sheets-Sheet 1
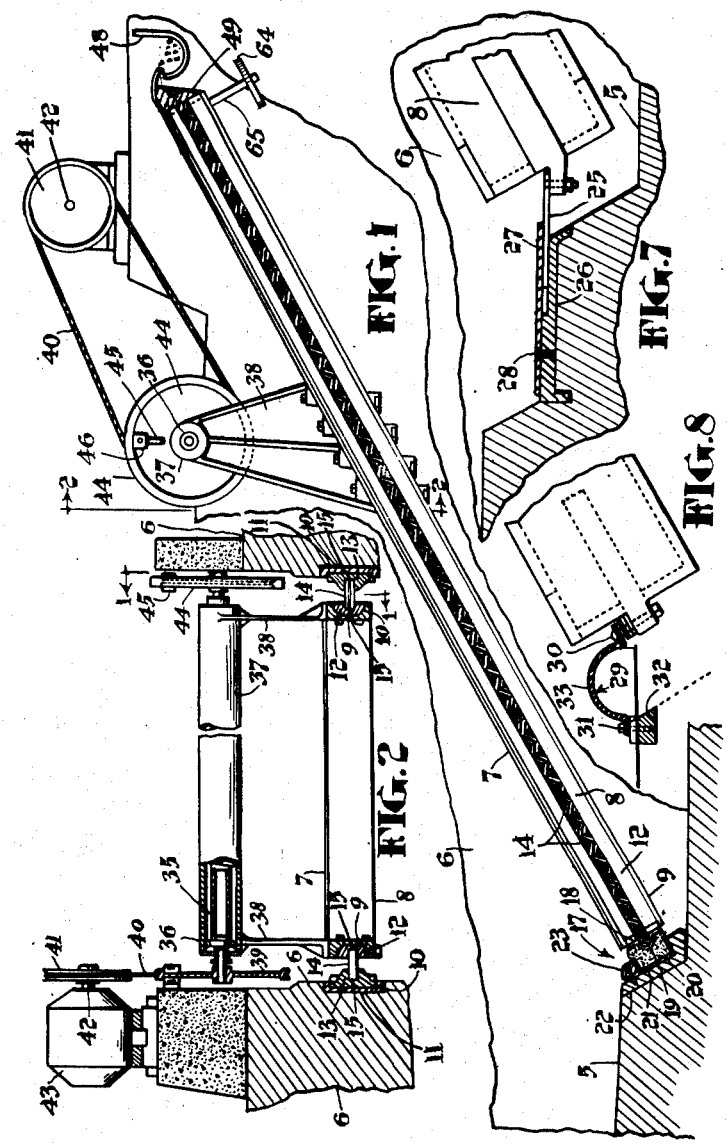
INVENTORS
BEN. COWAN
ADAM. CUNNINGHAM
BY Fetherstonhaugh & Co.
ATTORNEYS May 12, 1953 B. COWAN ET AL 2,638,226
SCREENING AND FILTERING APPARATUS
Filed Nov. 8, 1948 3 Sheets-Sheet 2
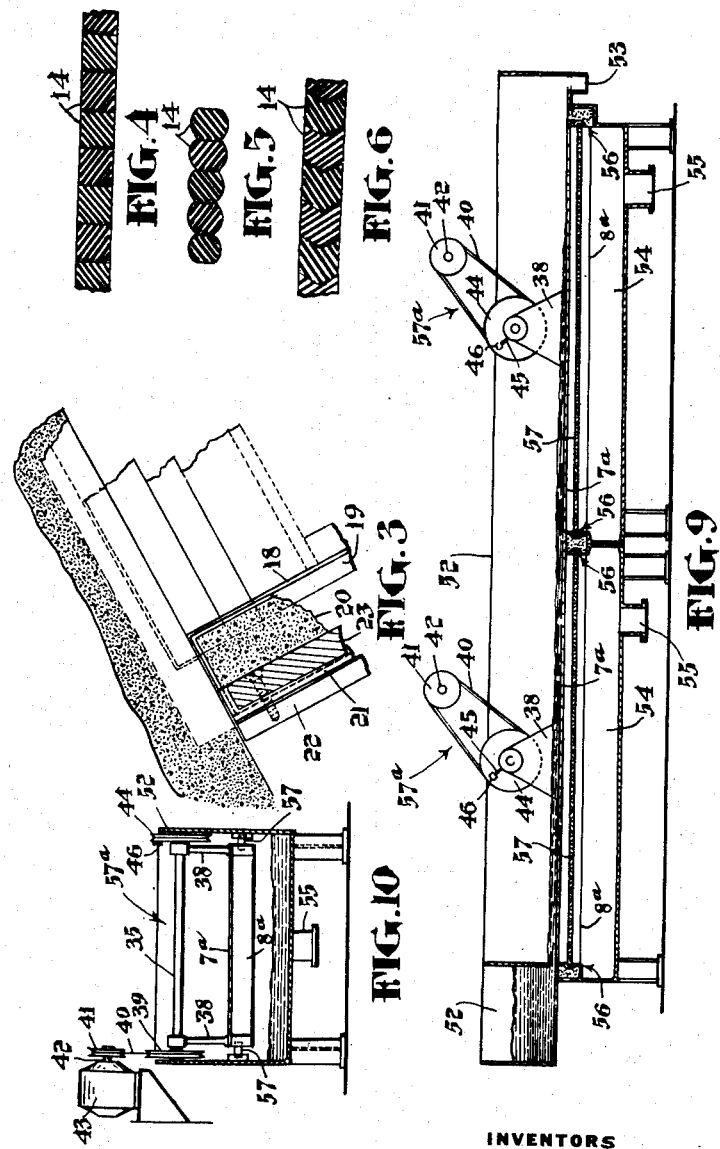
INVENTORS
BEN. COWAN
ADAM. CUNNINGHAM
BY Fetherstonhaugh & Co.
ATTORNEYS

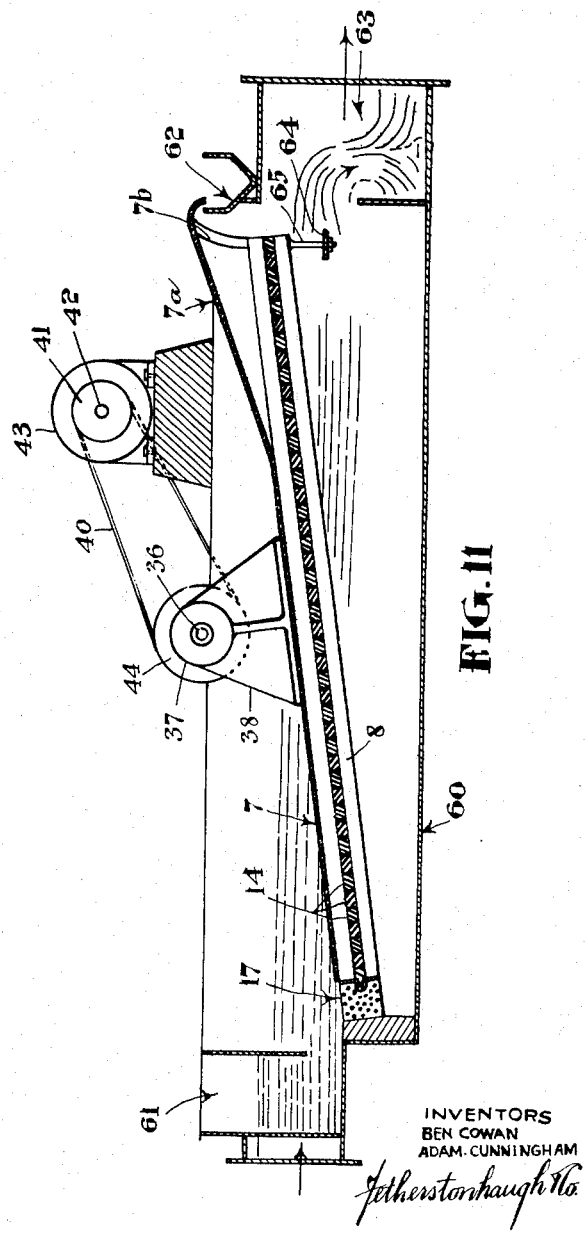

Patented May 12, 1953

2,638,226

UNITED STATES PATENT OFFICE 2,638,226

SCREENING AND FILTERING APPARATUS

Ben Cowan, Montreal, Quebec, and Adam Cunningham, Kenogami, Quebec, Canada

Application November 8, 1948, Serial No. 58,838

4 Claims. (Cl. 210—149)

This invention consists in the provision of improved screening and filtering apparatus in which one or more screen plates are mounted and vibrated in a novel manner to give an exceptionally efficient screening action.

In the present instance the invention will be described as applied to the screening and filtering of aqueous pulp suspensions used in the manufacture of paper. In this application the invention has been found to be particularly efficient and advantageous for the screening of pulp suspensions during their passage through an open-top flow channel or through a flat pulp screen. The invention is also capable of being advantageously employed for screening various other suspensions of solids in liquids; for the screening of various dry materials; and for various filtering operations.

Proceeding now to a more detailed description of the invention reference will be had to the accompanying drawings, in which—

Fig. 1 is a sectional view of our improved screening apparatus as adapted for the screening of a pulp suspension during its passage through an open-top flow channel, the plane of the section being substantially along the section line 1—1 of Fig. 2.

Fig. 2 is a transverse sectional view taken substantially along the line 2—2 of Fig. 1.

Fig. 3 is a fragmentary plan view of the lower portion of the screen assembly shown in Fig. 1.

Figs. 4 to 6 inclusive are sectional views of different types of side seals adapted to be used in connection with the assembly shown in Figs. 1 and 2.

Figs. 7 and 8 are sectional detail views of different forms of bottom seals adapted to be used in connection with the assembly shown in Figs. 1 and 2.

Fig. 9 is a longitudinal sectional view of a flat pulp screen embodying our improved screening apparatus.

Fig. 10 is a transverse sectional view of the screen assembly shown in Fig. 9.

Fig. 11 is a longitudinal sectional view of a pulp screen embodying a slight modification.

Referring to Figs. 1 to 8 inclusive, 5 designates the bottom and 6 the side walls of an open-top flow channel through which pulp stock is passed in a continuously flowing stream.

A vertically inclined screen plate 7 is arranged in the stock channel as shown in Fig. 1 and is carried by a screen frame 8.

The side members of screen frame 8 present outwardly facing channels 9 opposed to similar channels 10 afforded by channel-shaped members 11 embedded in the side walls 6 of the stock channel. Inner and outer seal holders 12 and 13 are fitted in the opposing channels 9 and 10 at each side of the screen frame and support between them a series of sealing members in the form of sealing blocks 14 arranged in abutting side-by-side relation as shown in Figs. 1 and 4, the ends of the blocks 14 being fitted in channels 15 provided in the holders 12 and 13.

The holders 12 and 13 and the sealing blocks 14 constitute side seals preventing leakage of stock between the sides of the screen frame and the adjacent sides 6 of the stock channel. The sealing blocks 14 are preferably made of live springy rubber with good elasticity and reasonable stiffness. They may, however, be made of any other suitable material having the requisite properties.

Instead of being rectangular as shown in Fig. 4 the sealing blocks 14 may be shaped as shown in Figs. 5 and 6.

In all cases the blocks are subjected to compression between the holders 12 and 13 and are butted together to prevent leakage between adjacent blocks.

Leakage between the bottom of the screen plate and the bottom of the stock channel is prevented by a suitable bottom seal generally indicated at 17. In the form shown in Fig. 1 this bottom seal comprises a metal sealing member 18 fastened to the lower edge of the screen frame and provided with a central, outwardly projecting, hollow rib 19 of suitable transverse curvature. The sealing rib 19 is embedded in a resilient sealing block 20 arranged in a holder 21. The holder 21 is held in place by means of a base plate 22 and a retaining strip 23 arranged on a bottom portion of the stock channel opposed to the lower end of the screen frame.

The bottom seal 17 shown in Fig. 1 may be replaced by either of the alternative forms of bottom seals shown in Figs. 7 and 8.

In the arrangement shown in Fig. 7, the bottom seal comprises a strip of rubber 25 fastened to the lower end of the screen frame and forming a flexible sealing lip which is received between a metal plate 26 fastened to the bottom of the stock channel and a stationary rubber sealing strip 27 which overlies and is fastened to the metal plate 26 by screws 28. In the arrangement shown in Fig. 8 the bottom seal consists of a rubber strip 29 having one edge fastened to the bottom of the screen frame by fastening members 30 and having the other edge fastened by fastening members 31 to a metal anchoring structure 32 mounted on the bottom wall of the stock channel. In this case the intermediate portion of the sealing strip 29 is transversely arched as indicated at 33.

The seals provided between the side and bottom portions of the screen frame and the corresponding wall portions of the stock channel support the screen so that it may be vibrated as hereinafter described. The means for vibrating the screen comprises a vibrating shaft 35 journalled in suitable bearings 36 provided at the ends of a shaft housing 37 formed integral with the upper portions of supporting brackets 38 having their lower portions bolted to the side members of the screen frame.

One end of shaft 35 projects beyond the corresponding end of shaft housing 37 and is equipped with a pulley 39 which is driven by a belt 40 from a drive pulley 41 mounted on an armature shaft 42 of an electric motor 43. The opposite end of shaft 35 also projects beyond the shaft housing 37 and has a weight carrying disk 44 mounted thereon. Disk 44 is provided with a radial slot 45 in which a weight 46 is slidably secured for radial adjustment. The disk 44 and weight 46 constitute an unbalanced mass which, during rotation of shaft 35, imparts a circular vibratory movement to the screen frame. The screen frame, when viewed as in Fig. 1, is vibrated in a clockwise direction through a circle of vibration so that the screen plate moves in the direction of its upper end when travelling through the upper half of the vibrating circle and in the direction of its lower end when travelling through the lower half of the vibrating circle. This movement of the screen causes the tailings accumulating there to be progressively moved toward the upper end of the screen and discharged into a tailings trough 48.

At its upper end the screen frame is provided with a counterweight 49. This counterweight is adjustable to bring the complete screen frame assembly (including the screen plates, the screen frame and the associated vibrating assembly) into balance on the shaft 35 at any pre-selected angle. The degree of vibration imparted to the screen frame may be varied by adjusting the position of the weight 46 along the slot 45 of disk 44. If the vibration is too great at slow speeds, i. e., when starting up, bumper blocks may be used to limit the initial travel of the screen frame.

Figs. 9 and 10 illustrate, more or less diagrammatically, one method of embodying my improvement or invention in a pulp screen of the flat screen type. In these figures I have shown a screen vat 52 such as that usually employed in flat pulp screens. This vat is provided at one end with a stock inlet box 52 and, at the opposite end, with an outlet 53 for the rejects. As the stock flows from the box 52 toward the outlet 53 it passes over two horizontally arranged screen plates 7a corresponding to the previously mentioned screen plates 7 and carried by screen frames 8a corresponding to the previously mentioned screen frames 9. The vat spaces 54 provided below the screens 7a are provided with outlets 55 for the screened stock. The ends of each screen frame 8a are flexibly supported by end seals 56 which may be designed substantially in accordance with the previously described end seal 17. The sides of the screen frame 8a are supported in the vat by side seals including rubber sealing blocks 57 which correspond to and may be mounted in substantially the same manner as the previously described sealing blocks 14 shown in Figs. 1 to 8 inclusive. Each of the screen frames 8a shown in Figs. 9 and 10 is vibrated by means of a vibrating mechanism 57a the component parts of which are the same as those of the previously described vibrating mechanism and are correspondingly numbered.

Referring to the modification shown in Fig. 11, 60 designates a screen vat provided at one end with a stock inlet box 61 and at the opposite end with a tailings trough 62 and a screen stock discharge trough 63. In this case the stock is screened during its passage through the vat by means of an inclined screen corresponding to that shown in Fig. 1. In this connection it will be noted that the screen plate 7 is supported in an inclined position by the screen frame 8 which, in turn, is supported in the vat by side and end seals corresponding to the side and end seals previously described in connection with Fig. 1. The mechanism for vibrating the screen shown in Fig. 11 is substantially the same as that shown in Fig. 1 and has its component parts correspondingly numbered.

In the case of the inclined screens shown in Figs. 1 and 11, it may be pointed out that, as clearly shown in Fig. 11, the screen is partly submerged in the stock so that there is a slight difference in fluid level between the upstream and downstream sides of the screen plate which gives an operating head of about ¾" to 1½". In both cases the cleanliness of the screen plate 7, which is due to its rapid vibratory motion, allows a high rate of flow with a small differential head, and the low head gives a very gentle and efficient screening action because there is little tendency to force slivers and rejects through the screen openings with the result that only the fine fibres and water pass through said openings. Also due to the fact that it is partially immersed in the stock, as shown in Fig. 11, the screen does not carry around a large weight of unscreened stock as do the basket type screens. In this connection it will be noted that the weight of stock on the screen is reduced by the buoyant effect resulting from the partial immersion of the screen which also reduces the inertia forces due to the vibration.

With the screen partially immersed in the stock in the flow channel of Fig. 1, or in the vat of Fig. 11, there is a tendency for the stock to restrict the motion of the immersed portion of the screen and there is also some restriction at the lower end of the screen due to the restraining action of the bottom seal 17. Because of this it is desirable to provide some means for balancing the resistance at both ends of the screen to produce an even movement all along the screen plate. This may be accomplished as shown in Fig. 11 by suspending one or more damper plates 64 from the upper end of the screen by any suitable form of suspension members 65. These damper plates are immersed in the stock below the upper end of the screen and may be varied in size and number to give the damping effect necessary to balance the resistance to motion at both ends of the screen. The damper plates also serve as agitators which prevent or lessen clotting or coagulation of the fibres.

In connection with the different modifications described herein it may be pointed out that due to the rapid motion of the screen plate the effective area of any perforation or opening of the screen plate is less than its apparent area and long slivers are rejected while short fibres pass through the opening. If the size of the screen openings are reduced sufficiently, the fibres will also be retained on the top of the screen plate with the result that a filtering action is obtained instead of a screening action. In this connection it may be explained that when the size of the screen openings are predetermined to give a filtering action the fibres retained on the plate form a mat which is caused to travel upwardly along the upper surface of the screen plate and over the upper discharge end of the plate. The size of screen openings required to give a thickening or felting action instead of a screening action will depend on the consistency of the stock and the length and character of the fibres to be removed from the water.

When the screen described herein is used as a bark screen to separate bark from water after the barking drum process, the holes may be ⅜" in diameter to provide an operating condition where the water is removed from the bark in a manner analogous to a thickening or filtering operation.

When the screen is used to thicken or filter groundwood pulp stock, the screen openings should be of the order of .050" in diameter, or less.

In some cases it is desirable that the upper portion of the screen plate 7 should have a sharp upward deflection with respect to the lower portion of the plate as indicated at 7a in Fig. 11. In this case the upper portion of the screen plate represented at 7a is deflected upwardly away from the screen supporting frame 8 which is straight throughout its length. The deflected upper portion 7a of the screen plate may be self-supporting or may be sustained in position by any suitable supporting members 7b extending upwardly from the screen frame 8. In this connection it may be explained that it is not desirable to deflect the upper portion of the screen supporting frame 8 to conform with the upward deflection of the screen plate since this action complicated the manufacture of the screen frame 8, especially with reference to the mounting of the side sealing blocks 14.

Having thus described the nature of our invention and several embodiments thereof, it will be understood that various modifications may be resorted to within the scope and spirit of the invention as defined by the appended claims.

We claim:

1. Apparatus for screening aqueous suspensions during the flow of the suspension through a substantially horizontal channel having side and bottom walls, comprising a substantially flat screen disposed in said channel at a slight upwardly inclined angle to the flow of the suspension, means for imparting to said screen a vibratory motion in which all points on said screen have the same orbital motion, flexible means supporting said screen and comprising a row of abutting flexible elements joined to said side walls and extending along the length of said screen to form a flexible seal between said screen and said side walls, each of said flexible elements having a dimension in the longitudinal direction not greater than the dimension in the vertical direction, whereby the resistance of the supporting means to longitudinal movement of the screen is substantially reduced to approximate the resistance of said supporting means to vertical movement.

2. Apparatus according to claim 1 in which said means for imparting vibratory motion to the screen comprise a driven, eccentrically loaded member rotatably mounted on said screen.

3. Apparatus for screening aqueous suspensions, comprising a substantially horizontal channel having side and bottom walls, means causing said suspension to flow through said channel with substantially uniform velocity through all parts of said channel, a flat screen disposed in said channel at a slight upwardly inclined angle not in excess of 30° to the longitudinal direction of said channel and with the upper side of said screen facing the upstream end of said channel, means supporting said screen and sealing said screen to said side and bottom walls, thus separating said channel into two parts, the first containing the incoming suspension, and the second containing only the screened, acceptable material, said supporting means comprising a row of abutting flexible elements joined to said side walls and extending along the length of said screen to form a flexible seal between said screen and said side walls, each of said flexible elements having a dimension in the longitudinal direction not greater than the dimension in the vertical direction whereby the resistance of the supporting means to longitudinal movement of the screen is substantially reduced to approximate the resistance of said supporting means to vertical movement, and means for imparting to said screen a vibratory motion in which all points on said screen have the same orbital motion in a direction to cause rejected particles to ride up said screen.

4. Apparatus according to claim 1 in which the elements of each side seal are confined in compression between said side wall and said screen and are thereby forced into pressure contact with each other to prevent leakage between adjacent blocks.

BEN COWAN.
ADAM CUNNINGHAM.

References Cited in the file of this patent

UNITED STATES PATENTS

| Number | Name | Date |
|---|---|---|
| 2,246,483 | Dillon | June 17, 1941 |
| 2,280,397 | Hutchison | Apr. 21, 1942 |
| 2,293,978 | Jonsson | Aug. 25, 1942 |
| 2,338,904 | Cowles | Jan. 11, 1944 |

FOREIGN PATENTS

| Number | Country | Date |
|---|---|---|
| 351,086 | Italy | Aug. 3, 1937 |